US006930249B2

(12) United States Patent
Chen et al.

(10) Patent No.: US 6,930,249 B2
(45) Date of Patent: Aug. 16, 2005

(54) CAGE MOUNTING ASSEMBLY (75) Inventors: Yun Lung Chen, Tu-chen (TW); Lin Ding, Shenzhen (CN); Hui Li, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/997,110

(22) Filed: Nov. 24, 2004

(65) Prior Publication Data

US 2005/0133239 A1    Jun. 23, 2005

Related U.S. Application Data (63) Continuation-in-part of application No. 10/946,739, filed on Sep. 21, 2004.

(30) Foreign Application Priority Data

Dec. 20, 2003 (CN) .................... 2003201252670 U
Feb. 16, 2004 (CN) .................... 2004200427456 U (51) Int. Cl.[7] .............................................. H02G 3/08
(52) U.S. Cl. ........................... 174/50; 174/60; 174/64; 361/683; 312/223.1
(58) Field of Search .................... 174/50, 60, 64, 174/17 R, 135, 58; 361/683, 686, 724; 312/223.1, 312/265.6; 220/4.31

(56) References Cited

U.S. PATENT DOCUMENTS

| | | | | |
|---|---|---|---|---|
| 6,104,613 A | * | 8/2000 | Urda et al. | 361/704 |
| 6,621,692 B1 | * | 9/2003 | Johnson et al. | 361/683 |
| 6,737,577 B1 | * | 5/2004 | Liao et al. | 174/50 |
| 6,768,055 B1 | * | 7/2004 | Gorin | 174/50 |
| 6,791,027 B1 | * | 9/2004 | Nicolai et al. | 174/50 |
| 6,809,258 B1 | * | 10/2004 | Dang et al. | 174/50 |

FOREIGN PATENT DOCUMENTS

| | | |
|---|---|---|
| TW | 371062 | 9/1999 |
| TW | 492614 | 6/2002 |

* cited by examiner

Primary Examiner—Dhiru R. Patel
(74) Attorney, Agent, or Firm—Wei Te Chung (57) ABSTRACT A cage mounting assembly includes a chassis (10), a locking member (20) and a cage (40). The chassis includes a bottom wall (12), the bottom wall engages with the locking member. The locking member extends an arm portion (24), and the arm portion forms a pair of pillars (34), each with a resilient member (38). The cage forms a pair of restraining tabs (54) thereunder corresponding to the resilient members of the locking member. When the cage is received into the chassis, the retaining tabs compress the resilient members, mounting the cage to the chassis. When the cage is disengaged from the chassis, the compressed resilient members push the cage out from the chassis.

19 Claims, 7 Drawing Sheets

CAGE MOUNTING ASSEMBLY

This application is a continue-in-part, claiming the benefit of U.S. application Ser. No. 10/946,739, filed on Sep. 21, 2004, and titled "Cage Mounting Assembly".

BACKGROUND OF THE INVENTION

CROSS-REFERENCE TO RELATED APPLICATION

This patent application is related to a contemporaneously filed application having the same applicant, the same assignee with this patent application, and titled "MOUNTING APPARATUS FOR DATA STORAGE DEVICE".

1. Field of the Invention

The present invention relates to a cage mounting assembly, and more particularly to a cage mounting assembly with a simplified configuration and capable of prompt for detaching direction for convenient use.

2. Description of Related Art

Various data storage devices are installed in electronic apparatus especially in a computer for communication and handling of data. Such devices include, for example, hard disk drives, floppy disk drives and CD-ROM (Compact Disk-Read Only Memory) drives. Usually corresponding cages are used to mount these data storage devices in a computer chassis. A typical cage mounting assembly is directly mounted to the computer chassis with a plurality of screws. However, a screwdriver or other detaching toolings are necessary for installation or removal of the screws, which causes inconvenience and time-consuming issues in cage assembly or disassembly process.

A typical pivot attaching cage mounting assembly is disclosed in Taiwan patent No. 492614. The cage mounting assembly comprises a chassis and two cages. The chassis includes a mounting panel, and the panel extends at least one locating tab. The two cages are pivotally attached to the mounting panel on two sides thereof. Each of the two cages integrally extends a supporting leg at one side thereof, and forms a flange at the other side thereof. The flanges of the two cages are rotatablely connected with the locating tab by connecting shafts. The supporting legs function as supports when any of the cages is rotated to a position paralleling to the other one. Each of the cages can be pivoted to a folding position upon the other one in case of cage maintenance or assembly. However, in the conventional cage mounting assembly disclosed above, the cages are pivotally connected with the chassis and cannot be conveniently detached form the chassis without using a screwdriver or other detaching toolings, which causes time-comsuming issue in cage assembly or disassembly process. In addition, the conventional cage mounting assembly cannot be automatically sprung out from the chassis in a direction perpendicular to a front panel of the chassis for convenience of users.

Another typical cage mounting assembly is disclosed in Taiwan Patent No. 371062. The cage mounting assembly comprises a cage and a fixing bracket. The fixing bracket forms a pair of first slideways and defines a pair of screw apertures. A top face of the cage forms a pair of second guideways paralleling with each other corresponding to the first slideways of the bracket and a pair of fixing pieces perpendicularly extending from the top face of the cage. Each fixing piece defines a fixing hole. In assembly, the second slideways of the cage slide along the first slideways of the bracket. A pair of bolts respectively penetrate through the corresponding fixing holes of the cage and received in the screw apertures of the bracket, thereby mounting the cage to the bracket. However, a suspension attaching means adopted in the conventional cage mounting assembly disclosed there before often causes vibration issue and can hardly provide a firm fixation. In addition, the cage of the conventional cage mounting assembly is attached to the bracket by screws. A screwdriver or other detaching toolings for assembly or disassembly of the screws is necessary, which is unduly inconvenient and laborious. Furthermore, the directly attaching means of the conventional cage mounting assembly can hardly prompt for the detaching direction of the cage.

SUMMARY OF THE INVENTION

Accordingly, an object of the present invention is to provide a cage mounting assembly with a simplified configuration and capable of prompt for detaching direction for convenient use.

To achieve the above object, a cage mounting assembly includes a chassis, a locking member and a cage. The chassis includes a bottom wall, a front wall and two side walls, the front wall defining an opening and a mounting aperture near the opening. The locking member is mounted on the bottom wall of the chassis, the locking member includes a bottom portion, an arm portion extending from one side of the bottom portion and an operating member formed from another side of the bottom portion. The arm portion engages to a pair of resilient members, and the operating member includes a hook and a handle extending from the hook. The cage includes a first and a second receiving plates. The first receiving plate forms a pair of restraining tabs thereunder corresponding to the pair of resilient members of the locking member. The second receiving plate forms a barb thereunder engaging with the hook of the locking member. When the cage is moved into the chassis through the opening, the pair of resilient members are compressed and the barb of the cage engages with the hook of the locking member, thereby mounting the cage to the chassis. When the handle is pressed down to disengage the hook from the barb, the compressed resilient members push the cage out from the chassis.

Other objects, advantages and novel features of the present invention will be drawn from the following detailed description of preferred embodiment of the present invention with the attached drawings, in which:

DETAILED DESCRIPTION OF THE INVENTION

Figure 1:
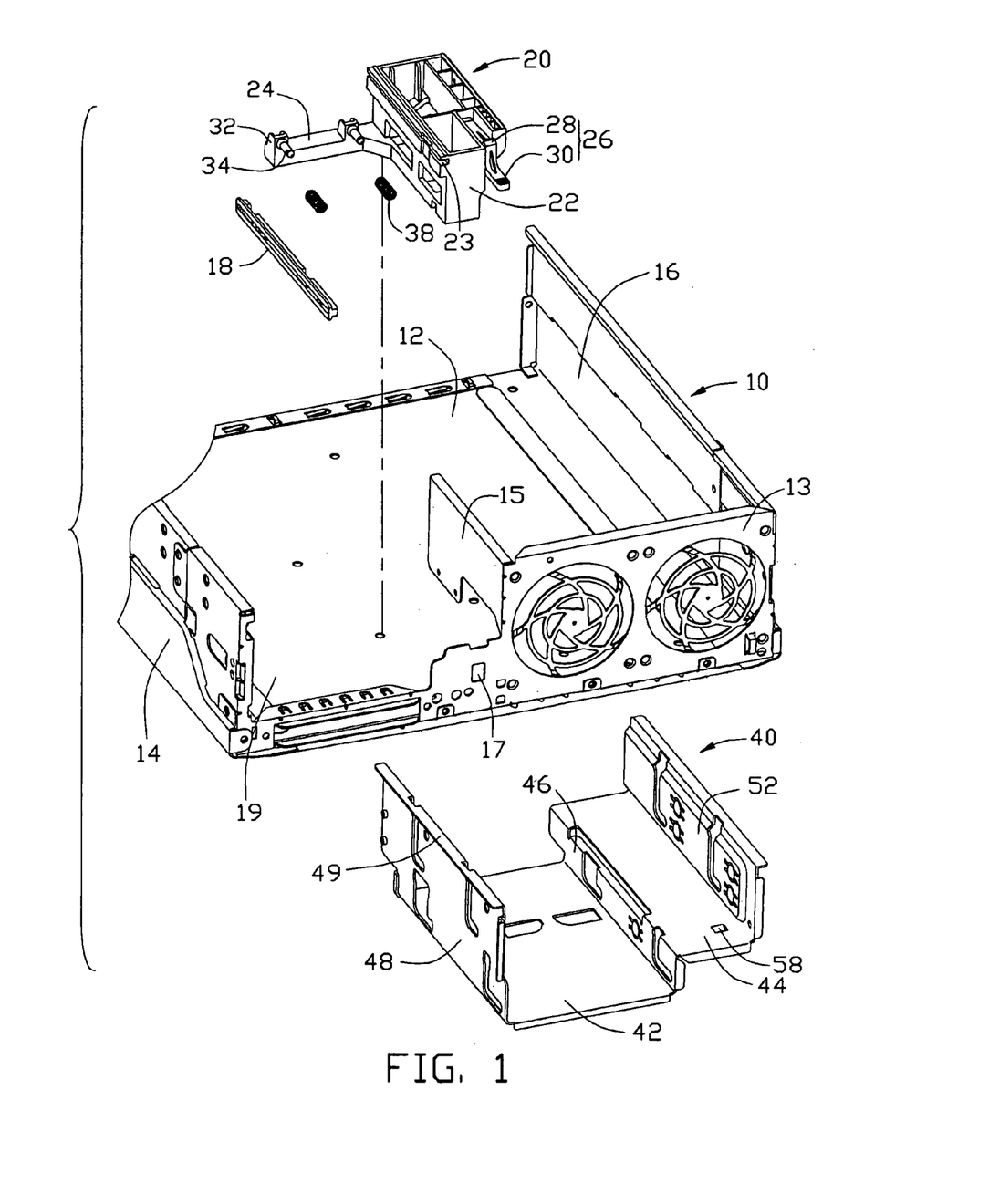
FIG. 1 is an exploded, isometric view of a cage mounting assembly in accordance with a preferred embodiment of the present invention comprising a chassis, a cage and a locking member.

Referring to FIG. 1, a cage mounting assembly in accordance with the preferred embodiment of the present invention comprises a chasiss 10, a locking member 20 engaged in the chassis 10, and a cage 40 mounted to the chassis 10 on the locking member 20. Usually data storage devices are received in the cage 40 for communication and handling of data. Such devices include, for example, hard disk drives, floppy disk drives or CD-ROMs, etc. In this embodiment, hard disk drives (not shown) are preferred.

The chassis 10 has a bottom wall 12. The bottom wall 12 perpendicularly extends two side walls 14,16 from two opposite edges (not labeled), and further perpendicularly extends a front wall 13. The front wall 13 defines an irregular opening 19 at a side portion and a rectangular mounting aperture 17 near the opening 19. The front wall 13 inwardly extends a supplement wall 15 from the middle thereof. One of the side walls 14,16 close to the irregular opening 19 supports a rod-like sliding rail 18.

Figure 2:
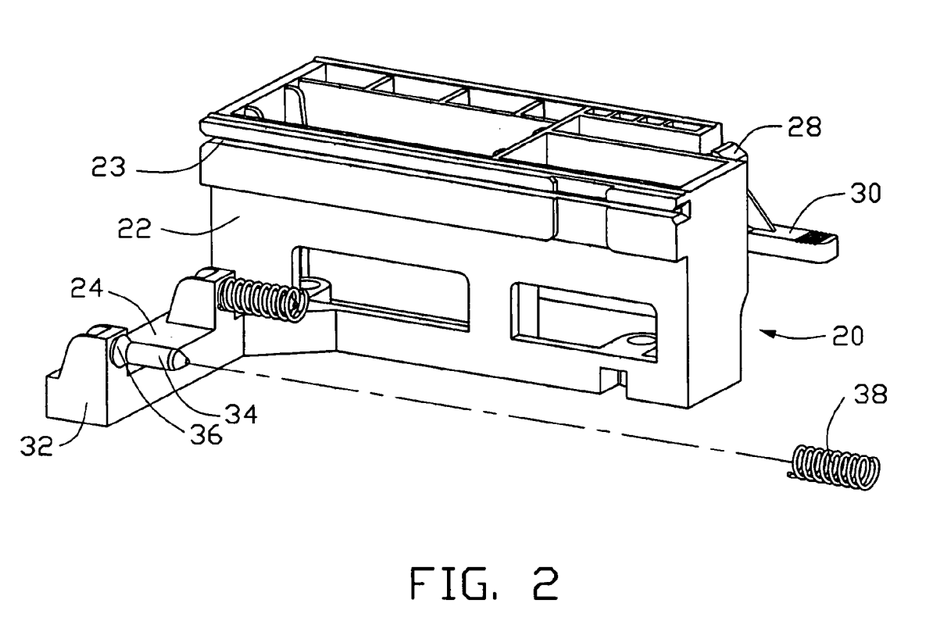
FIG. 2 is an enlarged view of the locking member of the cage mounting assembly of FIG. 1.

Also referring to FIG. 2, the locking member 20 comprises a bottom portion 22 fixed to the bottom wall 12 of the chassis 10 by bolt (not shown). The bottom portion 22 is planar at the top to cooperate with the sliding rail 18 on the side wall 14 to support the cage 40. The bottom portion 22 defines a guiding slot 23 paralleling to the bottom wall 12 of the chassis 10 and extends an arm portion 24 perpendicular to the bottom portion 22. The bottom portion 22 forms an operating member 26 from a opposite side thereof.

The operating member 26 extending from the bottom portion 22 is long and upwardly forms a hook 28 at a root thereof, and a handle 30 is formed from the hook 28 at a distal end of the operating member 26 for penetrating the mounting aperture 17 in the front wall 13 of the chassis 10. A pair of extrusion members 32 upwardly extends from the arm portion 24, each extrusion member 32 vertically extending a pillar 34 therefrom. Each pillar 34 forms a blocking ring 36 at the root thereof, and is shielded by a resilient member 38. The resilient members 38 are got stuck behind the blocking ring 36 for fixation.

Figure 3:
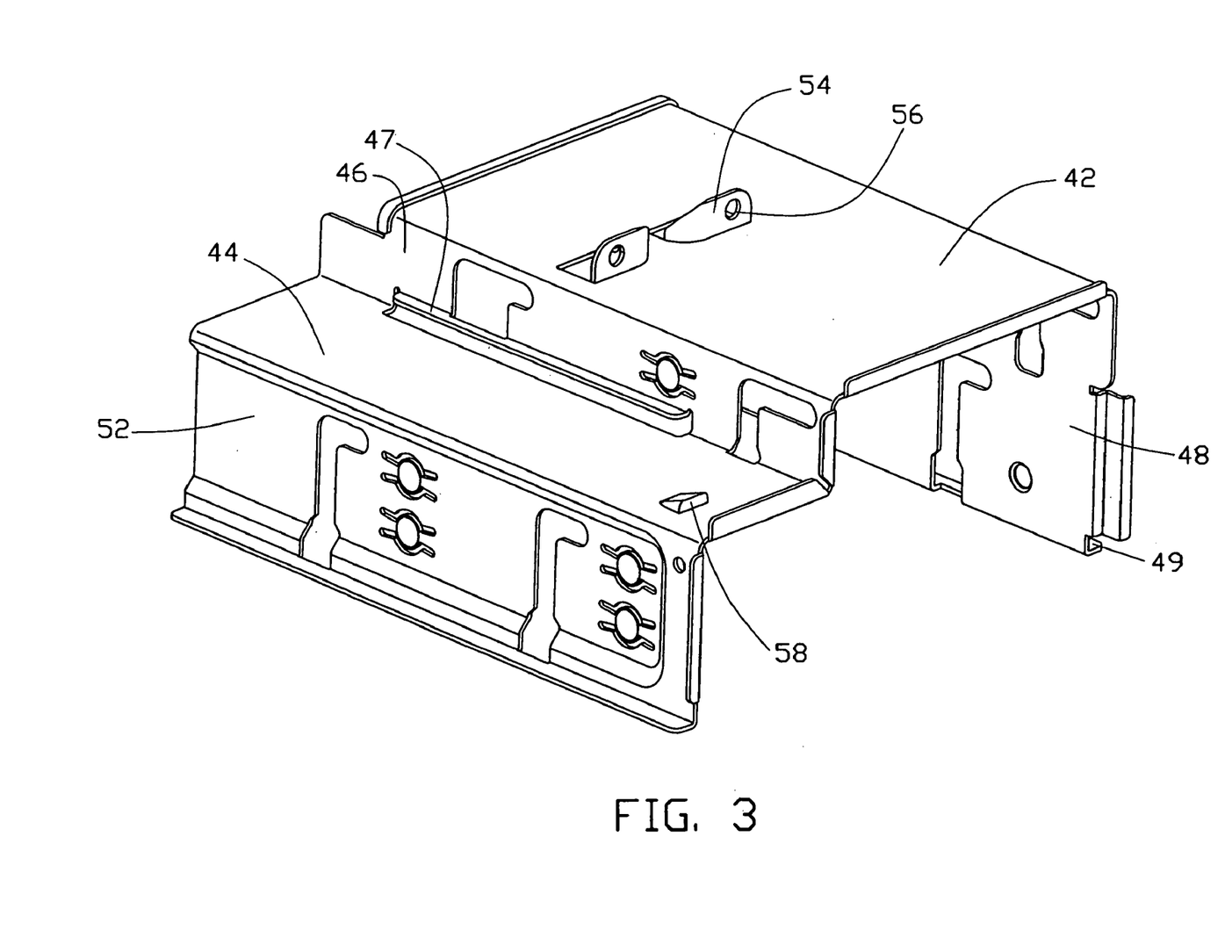
FIG. 3 is an isometric view of the cage of the cage mounting assembly, but viewed from another aspect.

Also referring to FIG. 3, the cage 40 is inserted into the chassis 10 from the irregular opening 19 and supported between the sliding rail 18 and the locking member 20. The cage 40 comprises a first receiving plate 42 and a second receiving plate 44, substantially paralleling with each other. A connecting plate 46 joints the first and second receiving plates 42, 44 together and two erect plates 48, 52 are formed from the free edges of the corresponding first and second receiving plate 42, 44.

The erect plate 48 extends a flange 49 substantially paralleling to the first receiving plate 42 and is capable of moving along the sliding rail 18. The connecting wall 46 extends a brim 47 received in corresponding guiding slot 23, for stably mounting the cage 40 to the chassis 10. A pair of restraining tabs 54 is formed vertically depending from the bottom the first receiving plate 42 corresponding to the pair of pillars formed on the extrusion members 24 of the arm portion 24. Each restraining tab 54 defines a through hole 56. The second receiving plate 44 forms a barb 58 corresponding to the hook 28 of the operating member 26 on the locking member 20.

Figure 4:
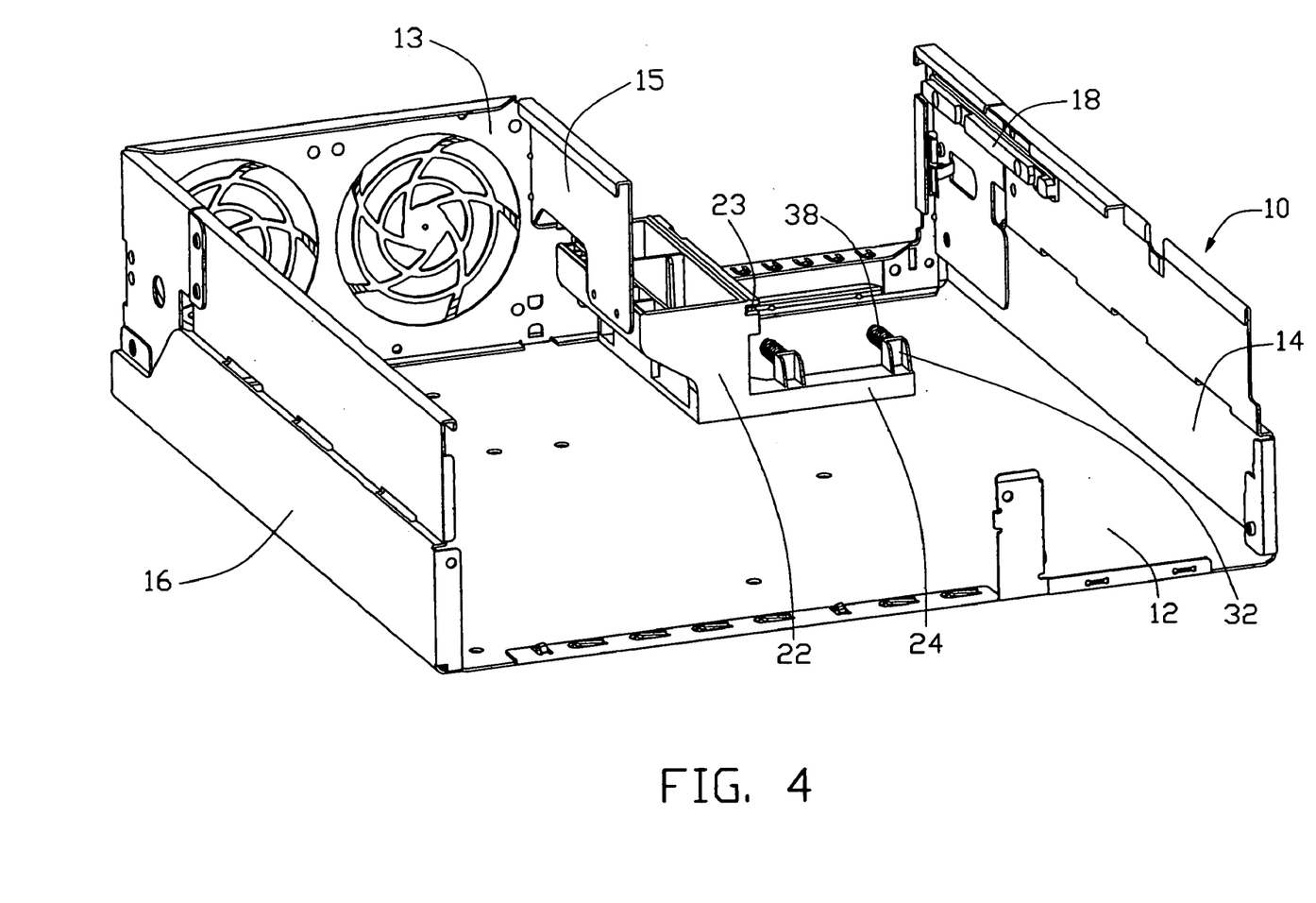
FIG. 4 is an assembled view, showing the assembled relationship between the chassis and the locking member.
Figure 5:
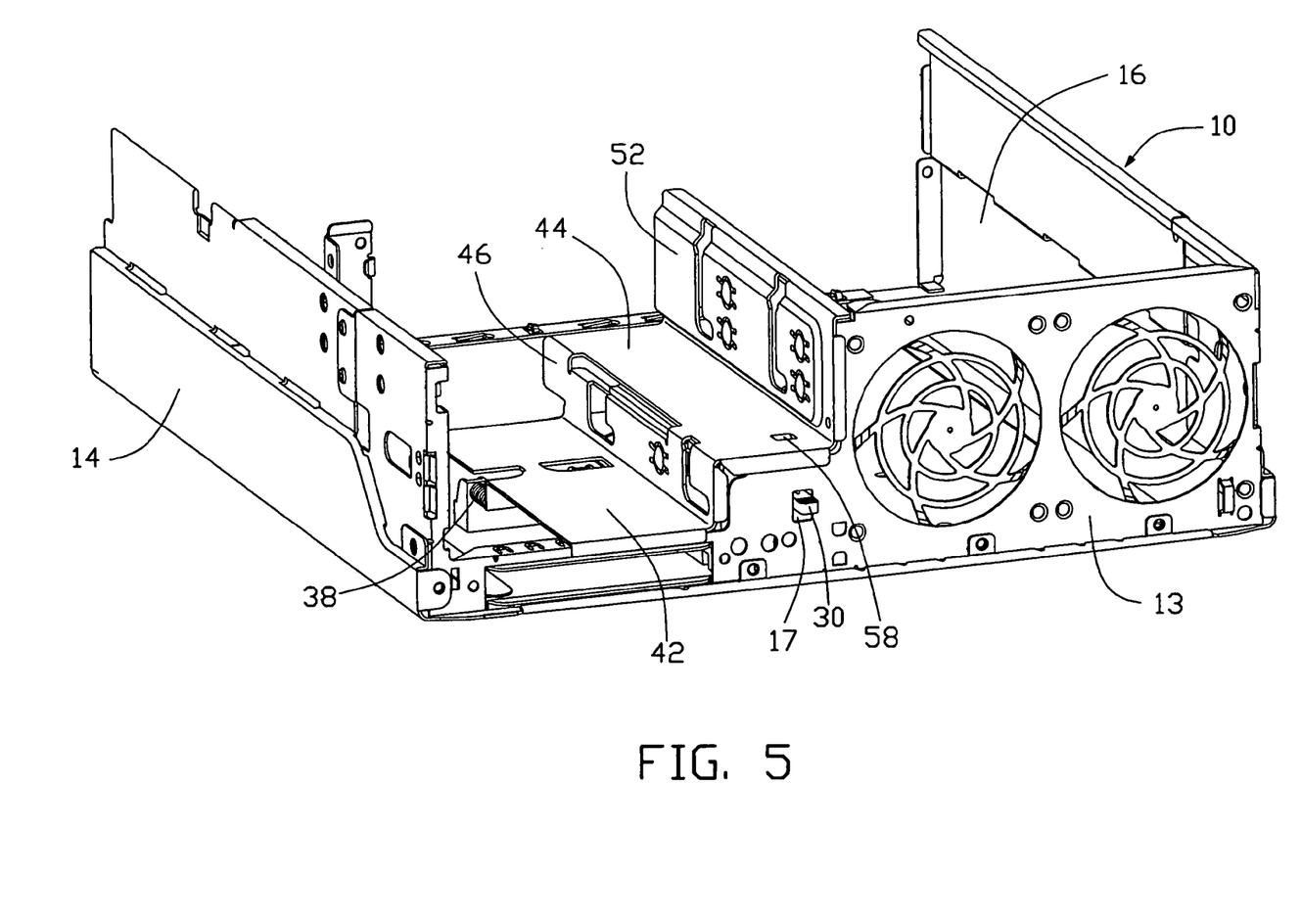
FIG. 5 is an assembled view of FIG. 1, with partly cut off for better illustration.

Referring to FIG. 4 and FIG. 5, in assembly, the locking member 20 is mounted to the bottom wall 12 of the chassis 10 by bolts (not shown) and leaving the handle 30 getting through the mounting aperture 17 of the chassis for detaching the cage 40 from the chassis 10. The cage 40 is moved in a direction substantially perpendicular to the front wall 13 of the chassis 10 and inserted into the chassis 10 through the irregular opening 19. When the cage 40 approaches the chassis 10, the brim 47 at the bottom of the cage 40 gets into the guiding slot 23 of the locking member 20, the flange 49 of the erect plate 48 lies on the sliding rail 18 of the side wall 14 and the second receiving plate 44 is supported at a top of the bottom portion 22.

The cage 40 is moved forward further, the pair of pillars 34 on the arm portions 24 align with the corresponding through holes 56 in the restraining tabs 54 and penetrate through the holes 56 afterwards. The cage 40 is continuously moved to the chassis 10, the restraining tabs 54 of the cage 40 begin to press the resilient members 38 around the corresponding pillars 34 and the barb 58 under the second receiving plate 44 approaches the hook 28 of the locking member 20 with the movement of the cage 40. When the cage 10 is moved into the chassis 10, the resilient member is compressed to a suitable extent so as to provide an elastic force on the cage 40 when the cage 40 is detached from the chassis 10, and the barb 58 under the cage 40 engages with the hook 28 of the locking member 20, thereby mounting the cage 40 to the chassis 10. Other attaching means such as screw fastening can also be adopted to mount the cage 40 to the chassis 10.

In disassembly, the handle 30 extending out from the mounting aperture 17 of the locking member 20 is pressed down. The handle 30 biased from the original position makes the barb 58 at the root of the operating member 26 disengage the hook 28 of the locking member 20, thereby releasing the cage 40 from the chassis 10. Then, the compressed resilient members 38 on the pillars 34 begin to stretch and counter-push the released cage 40 out from the chassis 10 for prompt of detaching direction of the cage 40.

The barb 58 formed under the second plate 44 of the cage 40 alternatively can be a hole to engage with the corresponding hook 28 of the locking member 20 for fixation of the cage 40. The receiving plate 42, 44 of the cage 40 can be variable from one to even plurality corresponding to the amount of data storage devices the cage 40 received therein.

Figure 6:
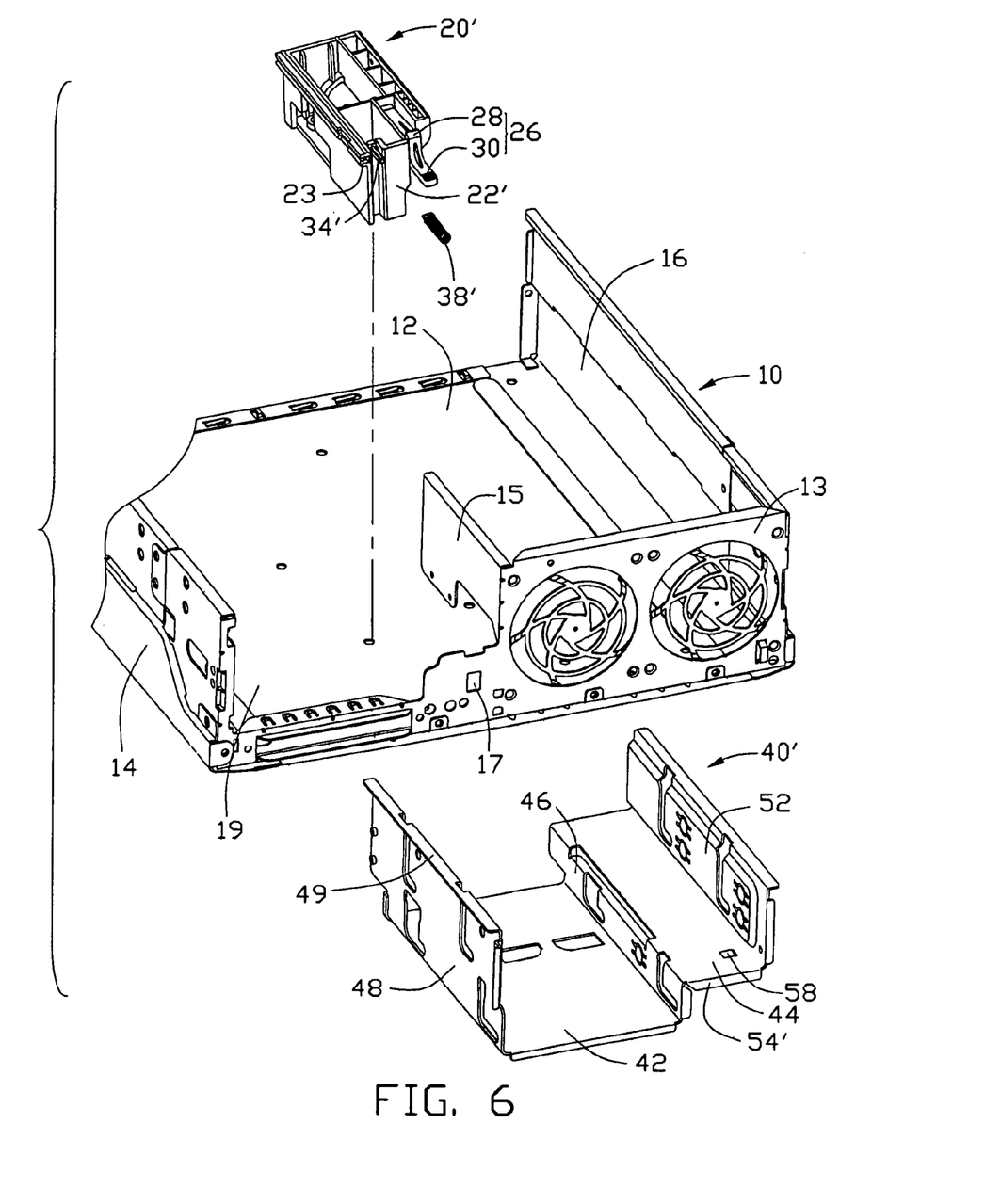
FIG. 6 is an exploded, isometric view of a cage mounting assembly in accordance with an alternative embodiment of the present invention.

Referring to FIG. 6, a cage mounting assembly in accordance with an alternative embodiment of the present invention is shown. The cage mounting assembly comprises the chassis 10, a locking member 20' and a cage 40'. The main configurations and assembling processes of the alternative embodiment are similar to that of the preferred embodiment. The differences between the present alternative embodiment and the preferred embodiment are set forth as following. A pillar 34' directly extends from the locking member 20' near the operating member 26. A resilient member 38' engagingly placed around the pillar 34'. A retaining tab 54' of the cage 40' depends from the second receiving plate 44 at a front edge thereof. When the cage 40' is received in the chassis 10, the resilient member 38' on the pillar 34' is compressed by the retaining tab 54' located at front. As long as the cage 40 is disengaged from the locking member 20', the compressed resilient member 38' comes to stretch and applies a force on the retaining tab 54', thereby pushing the cage 40' out from the chassis 10.

Figure 7:
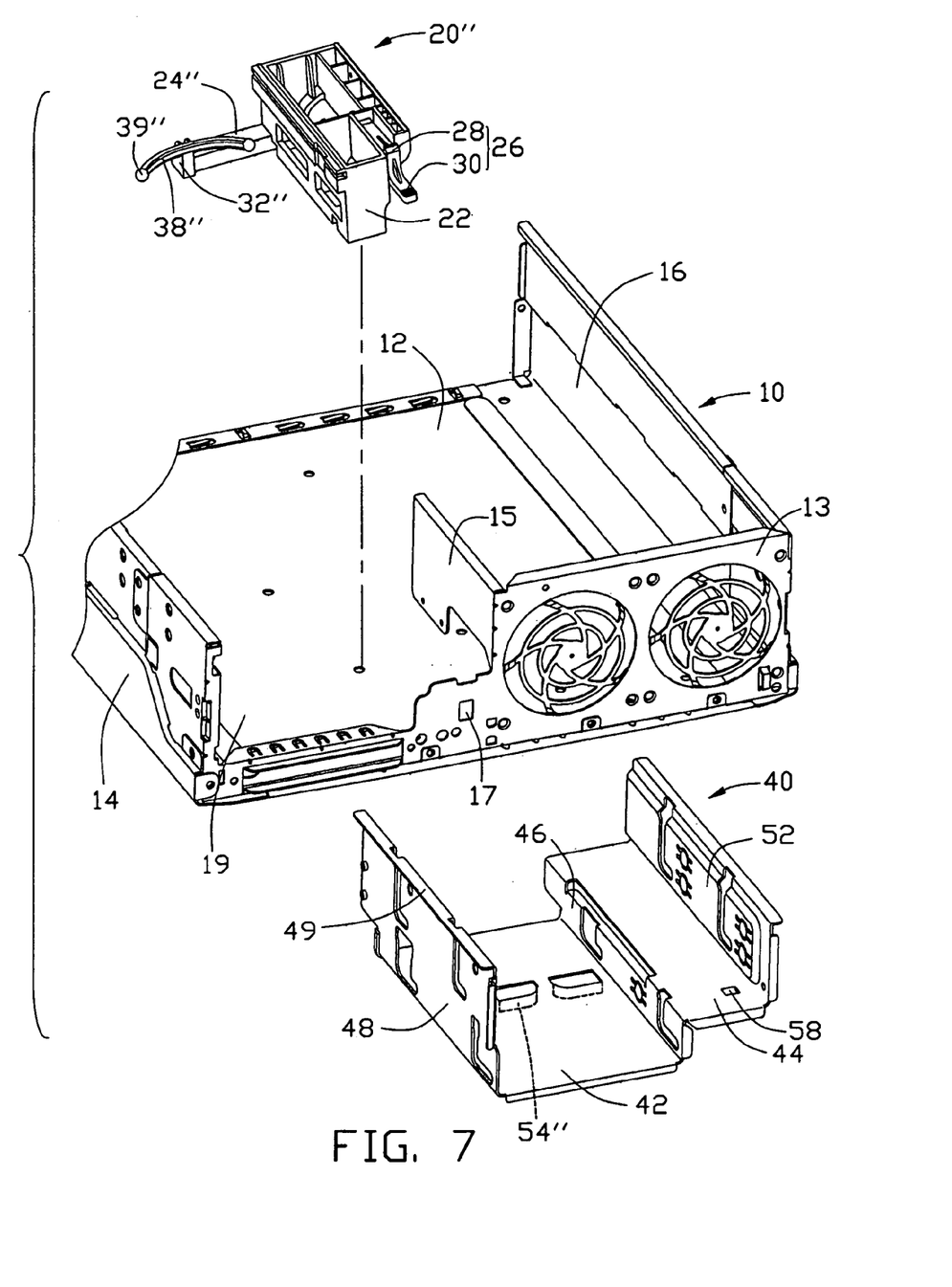
FIG. 7 is an exploded, isometric view of a cage mounting assembly in accordance with a further alternative embodiment of the present invention.

Referring to FIG. 7, a cage mounting assembly in accordance with a further alternative embodiment of the present invention is shown. The cage mounting assembly comprises the chassis 10, a locking member 20" and the cage 40. The main configurations and assembling processes of the further alternative embodiment are similar to that of the preferred embodiment. The differences between the further alternative embodiment and the preferred embodiment are set forth as following. The locking member 20" extends an arm portion 24" from one side portion thereof. The free distal end of the arm portion 24" forms a protrusion member 32", and the protrusion member 32" is substantially perpendicular to the arm portion 24". The top of the protrusion member 32" forms a resilient member 38". The resilient member 38" is arc-shaped and forms a pair of pushing ends 39" corresponding to the pair of retaining tabs 54" under the first receiving plate 42 of the cage 40. When the cage 40 is mounted in the chassis 10, the resilient member 38" is compressed by the pair of retaining tabs 54". As long as the cage 40 is disengaged from the locking member 20", the compressed resilient member 38" comes to stretch and the pushing ends 39" respectively apply a force on the corresponding retaining tabs 54", thereby pushing the cage 40' out from the chassis 10.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A cage mounting assembly comprising: a chassis comprising a bottom wall, a front wall and two side walls, the front wall defining an opening; a locking member mounted on the bottom wall of the chassis, an operating member formed from the locking member, at least one resilient member arranged to the locking member, the operating member comprising an engaging hook and a handle; and a cage comprising at least two receiving plates, one of said receiving plates forming at least one restraining tab corresponding to said resilient member of the locking member, and the other of said receiving plates forming an engaging barb thereunder engaging with the first engaging hook of the locking member; wherein the cage is received into the chassis through the opening, the at least one resilient member is compressed and the engaging barb of the cage engages with the engaging hook of the locking member, thereby mounting the cage to the chassis; when the handle is pressed to disengage the hook and the engaging barb, and the cage is pushed out from the chassis by the resilient member.

2. The cage mounting assembly as claimed in claim 1, wherein the locking member horizontally defines a guiding slot along one side portion thereof.

3. The cage mounting assembly as claimed in claim 2, wherein the cage comprises a connecting plate jointing the at least two receiving plates, and two erect plates respectively extending from the receiving plates.

4. The cage mounting assembly as claimed in claim 3, wherein the connecting plate of the cage forms a brim slidably received in the guiding slot of the locking member.

5. The cage mounting assembly as claimed in claim 1, wherein the locking member is arranged under an upper one of the receiving plates, and at least one pillar extending from the locking member, the at least one resilient member set around the pillar.

6. The cage mounting assembly as claimed in claim 5, wherein said pillar forms a blocking portion for mounting the resilient member on said pillar.

7. The cage mounting assembly as claimed in claim 1, wherein an arm portion extends from the locking member, and at least one protrusion member extends from the arm portion, said protrusion member is a curved strip.

8. The cage mounting assembly as claimed in claim 1, wherein the front wall of the chassis defines a mounting aperture for the handle of the locking member penetrating therethrough.

9. A computer case comprising: a chassis comprising a bottom wall, the bottom wall engaging with a locking member, the locking member engaging at least one resilient member and forming an engaging hook; and a cage mounted to the chassis, said cage comprises at least two receiving plates, one of said plates forming a restraining tab corresponding to the at least one resilient member of the locking member, the other of said plates having an engaging barb; wherein when the cage is received into the chassis, said resilient member is compressed, then the engaging hook engages with the engaging barb, thereby mounting the cage to the chassis; when the first engaging hook is disengaged from the engaging barb, the compressed resilient member pushes the cage out from the chassis.

10. The computer case as claimed in the claim 9, wherein the chassis further comprises two side walls substantially perpendicularly extending from the bottom wall, one of the two side walls is mounted with a sliding rail.

11. The computer case as claimed in the claim 9, wherein the cage forms said engaging barb corresponding to the engaging hook of the locking member.

12. The computer case as claimed in the claim 9, wherein the locking member defines a guiding slot parallel to the bottom wall, an operating member and an arm portion respectively extend from the locking member.

13. The computer case as claimed in the claim 12, wherein the operating member comprises said engaging hook and a handle extending therefrom.

14. The computer case as claimed in the claim 12, wherein at least one protrusion member extends from the locking member; the protrusion member is a curved strip and integrally forms the arm portion at its free end thereof.

15. The computer case as claimed in the claim 9, wherein the locking member extends at least one pillar, and the resilient member sets around the pillar.

16. The computer case as claimed in the claim 9, wherein the cage comprises a connecting plate and two erect plates, the connecting plate forms a brim received in a guiding slot in the locking member.

17. The computer case as claimed in the claim 9, wherein the chassis further comprises a front wall, the front wall defines an opening and a mounting aperture, and the first engaging hook penetrates through the mounting aperture.

18. A cage mounting assembly comprising: a chassis comprising a front wall, the front wall defining an opening in a front-to-back direction; a locking member mounted to the chassis, at least one resilient member formed along said front-to-back direction and arranged to the locking member; said locking member further comprises a pillar directly extends from the locking member near an operating member, said resilient member engagingly placed around the pillar, and a cage inserted into the chassis through the opening along said front-to-back direction; said cage comprises a plurality of receiving plates, one of said receiving plates forming at least one restraining tab corresponding to said resilient member, and another of said plates forming an engaging barb, wherein the at least one resilient member of the locking member is elastically deformed when the cage is received in the chassis, after the cage is disengaged from the chassis, the cage is pushed out from the chassis by restoring force of the compressed resilient member.

19. The assembly as claimed in claim 18, wherein said locking member defines a hook on said resilient member to latchably engage the barb of said another of said plates, and a releasing handle exposed to the front wall of said locking member for deflecting the resilient member to disengage the hook from the barb.

* * * * *